United States Patent [19]

Tedham et al.

[11] Patent Number: 4,971,277
[45] Date of Patent: Nov. 20, 1990

[54] ADAPTER SUPPORT

[75] Inventors: Thomas A. Tedham, Boston; See C. Leung, Tewksbury, both of Mass.

[73] Assignee: Wang Laboratories, Inc., Lowell, Mass.

[21] Appl. No.: 271,206

[22] Filed: Nov. 14, 1988

Related U.S. Application Data

[63] Continuation of Ser. No. 61,928, Jun. 11, 1987, Pat. No. 4,787,585.

[51] Int. Cl.5 .......................................... F16M 11/00
[52] U.S. Cl. .................................... 248/175; 248/558; 248/153
[58] Field of Search ............... 248/175, 153, 1 A, 302, 248/107, 465.1, 97, 165, 166, 188.1, 558, 440.1, 94; 211/181, 133; 403/4

[56] References Cited

U.S. PATENT DOCUMENTS

| | | | |
|---|---|---|---|
| 1,241,486 | 10/1917 | Armstrong | 248/175 X |
| 1,571,659 | 2/1926 | Conklin | 5/189 X |
| 2,212,207 | 8/1940 | Irwin et al. | 248/175 X |
| 2,663,391 | 12/1953 | Kuhns | 248/166 |
| 2,940,599 | 6/1960 | Gentner | 248/153 X |
| 4,267,997 | 5/1981 | Meier | 248/153 X |
| 4,730,799 | 3/1988 | Foss et al. | 248/175 X |
| 4,787,585 | 11/1988 | Tedham et al. | 248/558 X |

FOREIGN PATENT DOCUMENTS

| | | | |
|---|---|---|---|
| 2061234 | 6/1972 | Fed. Rep. of Germany | 248/465.1 |
| 518059 | 3/1955 | Italy | 248/153 |
| 381392 | 10/1964 | Switzerland | 211/133 |
| 675077 | 7/1952 | United Kingdom | 248/175 |

Primary Examiner—Karen J. Chotkowski
Attorney, Agent, or Firm—Michael H. Shanahan; Kenneth L. Milik

[57] ABSTRACT

An adapter support holds a desktop computer enclosure securely in a vertical position on a floor installation. The adapter engages the enclosures footpads and may be alternatively assembled to stabilize the enclosure in the center of a floor, or may be configured to permit installing close to a wall.

1 Claim, 2 Drawing Sheets

ADAPTER SUPPORT

This is a continuation of co-pending application Ser. No. 07/061,928 filed on June 11, 1987, now U.S. Pat. No. 4,787,588.

BRIEF SUMMARY OF THE INVENTION

This invention relates to an adapter support which may be used to adapt a desktop enclosure for computer components or the like for installation on a floor. The adapter engages footpads of the enclosure, which are attached to the enclosure for desktop installation, and may be configured in two alternative configurations for supporting the enclosure in a mid-floor position, or alternatively in an against-wall position. The adapter support holds the enclosure securely above the floor level, provides a stable base for the enclosure, and presents a low profile to minimize the hazards of tripping.

DETAILED DESCRIPTION

Figure 1:
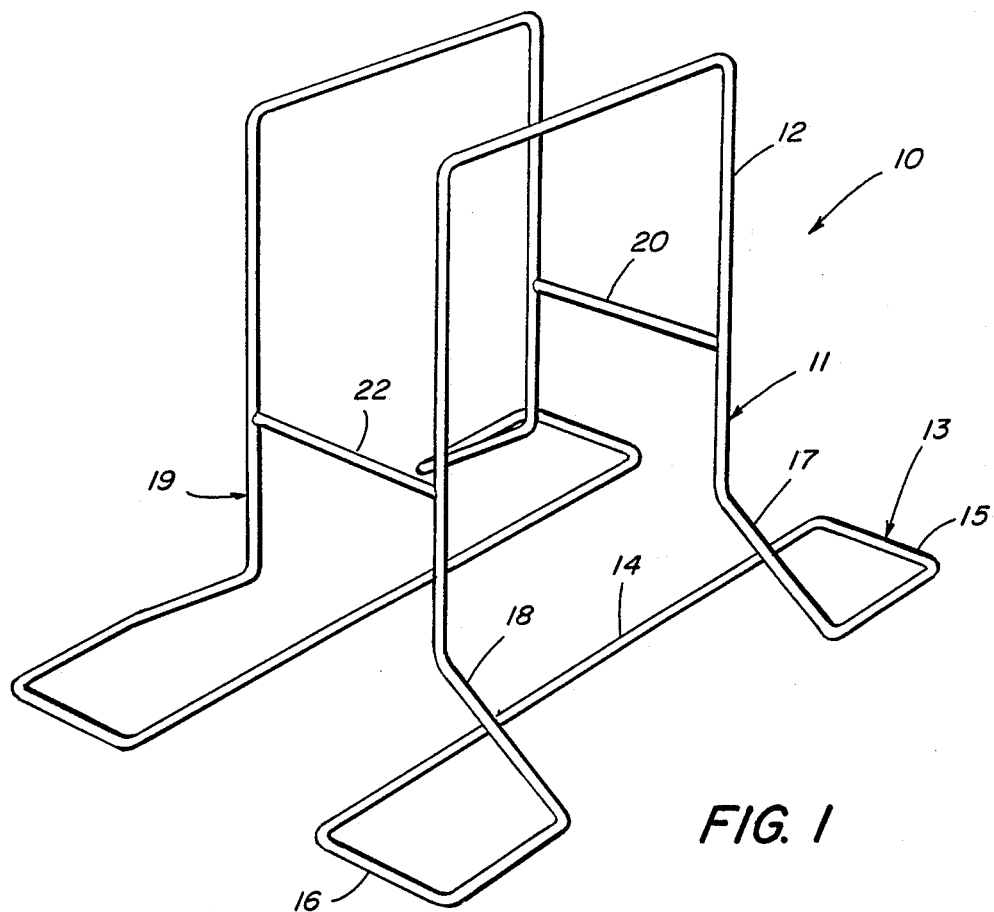
FIG. 1 shows in a perspective view an adapter support according to the invention.

Adapter support 10 according to the invention includes a first element 11 formed as a closed bent rod. Element 11 includes bight portion 12 formed in a plane and extending upwards, and floor contacting portion 13. Floor contacting portion 13 includes linear portion 14 which is longer than the width of bight portion 12, and stabilizing bends 15 and 16 extending from the ends of linear portion 14. Transition portions 17 and 18 join bight portion 12 and floor contacting portion 13, maintaining the planes of the bight and the floor contacting portions at right angles to one another with linear portion 14 in the plane of the bight portion.

Second element 19 is identical to first element 11.

First and second spacers 20, 22 having the form of straight rods connect first element 11 and second element 19, providing a bridge therebetween for the support of enclosure 23. Means for affixing the spacers 20, 22 may advantageously be bolts (101) fitting into tapped holes in the ends of the spacers.

The use of adapter support 10 to support generally flat desktop computer enclosure 24 in a vertical position of a floor. Enclosure 24 includes pad supports 25, 26, 27, 28, on which the enclosure is supported when it is installed on a desktop. Bight portion 12 of the adapter support is sized to fit snugly between pad supports 27, 28, and spacers 20, 22 are sized to span the width of the enclosure so that the enclosure fits snugly between bight portions of the first and second elements 11 and 19, while resting on spacers 20, 22.

Figure 3:
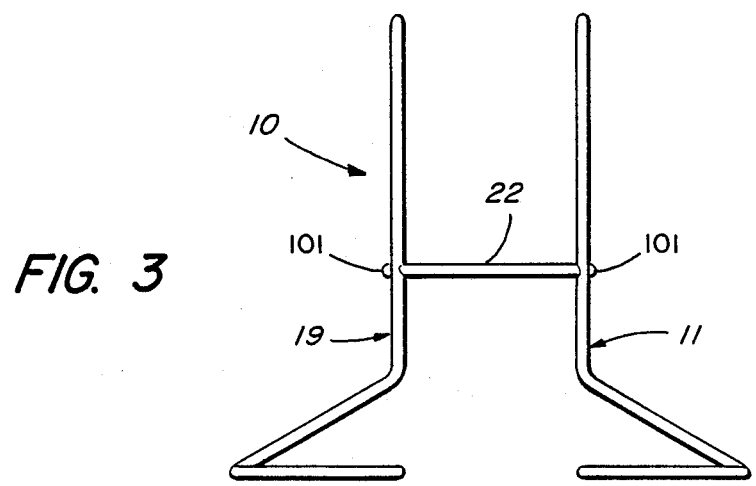
FIGS. 3 and 4 show alternative ways of configuring the adapter support of FIG. 1.
Figure 2:
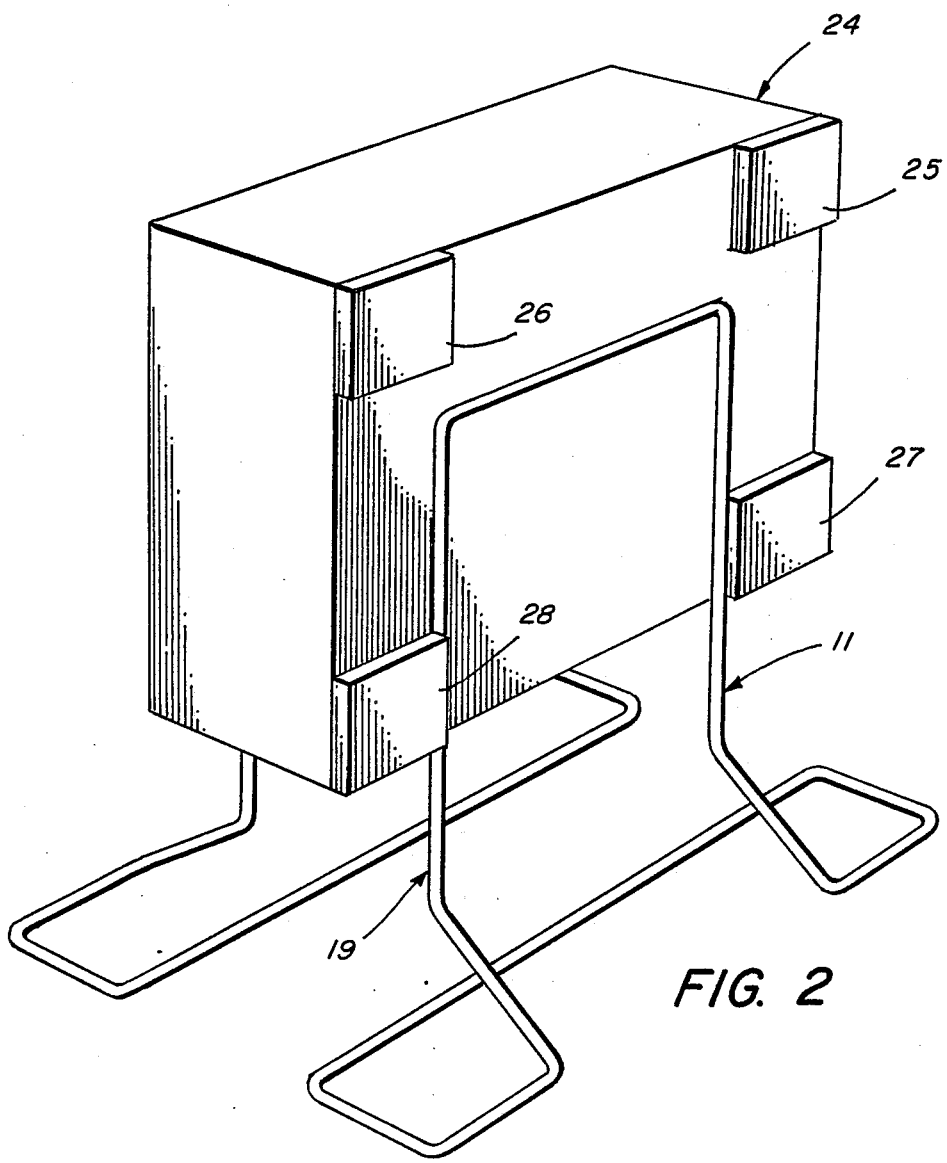
FIG. 2 shows the adapter support of FIG. 1 holding an enclosure.
Figure 4:
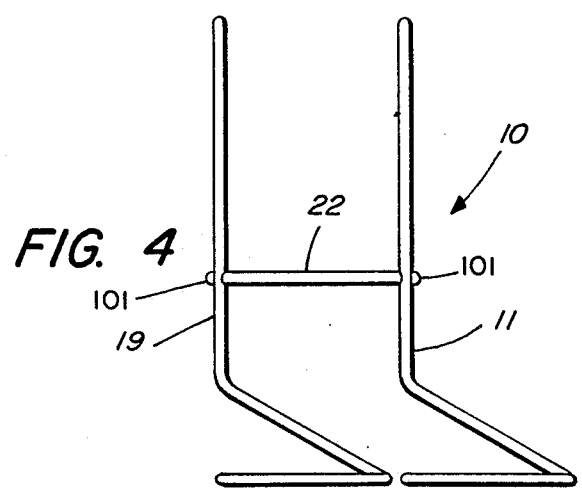

The adapter support may be assembled as shown in FIG. 3, with the floor contacting portions extending in opposite directions, to stabilize the enclosure in all directions for an installation in the center of a floor area, or it may be assembled as shown in FIG. 4 for installation close to a wall.

What is claimed is:

1. An adapter support for adapting a generally flat, desktop enclosure having pad supports on corners for support in a horizontal position on a desktop, for installation in a vertical position on a floor, said adapter support comprising a first element formed as a closed bent loop of rod, said first element having
an upward bight portion with sides and formed in a plane,
a floor contacting portion comprising a linear portion and two stabilizing bends, said linear portion being longer than the space between the sides of said bight, said floor contacting portion being formed in a plane, and said two stabilizing bends extending from the ends of said linear portion and to the same side of the linear portion, and
two transisiton portions joining the ends of the stabilizing bends with the ends of the bight portion and holding planes of the bight portion and the floor contacting portion perpendicular to each other with said linear portion in the plane of the bight portion.
a second element identical to the first element,
a first spacer having the form of a straight rod and a length equal to the thickness of said enclosure, and
a second spacer identical to the first spacer,
including means for affixing said spacers and the first and second elements together in a first configuration and in a second configuration,
the second configuration positioning the first and the second elements to be oriented identically, and having the spacers bridging between the first and second elements from positions on opposite sides of said bights,
the first configuration positioning the first and second elements such that there is a rotation between the orientation of the first element and the orientation the second element of 180 deg around an axis perpendicular to the plane of the floor contacting portion of the first element, and such that the spacers bridge between the first and second elements from positions on opposite sides of said bights.

* * * * *